United States Patent [19]

Yamada et al.

[11] Patent Number: 5,091,865
[45] Date of Patent: Feb. 25, 1992

[54] PATTERN READING APPARATUS HAVING VARIABLE READING PERIOD

[75] Inventors: Yasuhiro Yamada, Yokohama; Yasuko Miyazaki, Tokyo; Takashi Kanemoto, Tokyo; Mikiharu Matsuoka, Tokyo; Hirohiko Katayama, Kawasaki, all of Japan

[73] Assignee: Canon Kabushiki Kaisha, Tokyo, Japan

[21] Appl. No.: 718,911

[22] Filed: Jun. 24, 1991

Related U.S. Application Data

[63] Continuation of Ser. No. 569,583, Aug. 20, 1990, abandoned, which is a continuation of Ser. No. 278,493, Dec. 1, 1988, abandoned.

[30] Foreign Application Priority Data

Dec. 14, 1987 [JP] Japan .................. 62-314233

[51] Int. Cl.$^5$ ................ G06F 3/05; G09B 21/00
[52] U.S. Cl. ................ 395/153; 340/407; 340/825.19; 434/114
[58] Field of Search ............... 340/825.19, 407; 358/94; 434/113, 114; 364/518

[56] References Cited

U.S. PATENT DOCUMENTS

| | | | |
|---|---|---|---|
| 3,250,023 | 5/1966 | Benson | 434/114 |
| 3,594,787 | 7/1971 | Ickes | 340/407 |
| 3,628,193 | 12/1971 | Collins | 340/407 X |
| 4,644,339 | 2/1987 | Ruder | 340/731 |
| 4,881,900 | 11/1989 | Matsuoka et al. | 434/113 |

FOREIGN PATENT DOCUMENTS 46854 of 1981 Japan .

OTHER PUBLICATIONS

Visual Handicap and the Challenge of Information Technology in Employment, C. Mattison, Microprocessors and Microsystems, Butterworth & Co., vol. 8, No. 10, Dec. 1984, pp. 520-523.
A Tactile Vision-Substitution System for the Blind: Computer-Controlled Partial Image Sequencing. K. Kaczmarek, IEEE Transactions on Biomedical Engineering, IEEE, New York, BME-32, No. 8, Aug. 1985, pp. 602-608.

Primary Examiner—Heather R. Herndon
Assistant Examiner—Raymond J. Bayerl
Attorney, Agent, or Firm—Fitzpatrick, Cella, Harper & Scinto

[57] ABSTRACT

A pattern reading apparatus includes a conversion device for reading optical pattern information and converting it into electrical signals. A display device is provided for displaying pattern information by vibration of plural vibrating pins, the displayed pattern information corresponding to the pattern information read by the conversion device. A reading period determining device is provided for variably setting the reading period of the pattern information read by the conversion device, and a control circuit causes the electrical signals output from the conversion device to be displayed by the display device according to the reading period set by the reading period determining device.

17 Claims, 3 Drawing Sheets

PATTERN READING APPARATUS HAVING VARIABLE READING PERIOD

This application is a continuation of application Ser. No. 07/569,583 filed Aug. 20, 1990, now abandoned, which is a continuation of application Ser. No. 07/278,493 filed Dec. 1, 1988, now abandoned.

BACKGROUND OF THE INVENTION

1. Field of the Invention

The present invention relates to a pattern reading apparatus capable of displaying optical patterns such as characters, symbols or designs by a tactile display device provided with a plurality of vibrating pins, causing vibration corresponding to said pattern.

2. Related Background Art

In the field of the pattern reading apparatus of this kind, the Japanese Patent Kokoku 56-46854 already discloses an apparatus which converts an optical pattern, read through a camera unit, into electrical signals and displays said pattern by vibration of a bimorph tactile array of matrix structure, and which is already utilized as a reader for blind persons.

However such a conventional pattern reading apparatus has a fixed frequency for reading the pattern, and therefore generates significant flickering or beat in the read pattern, in case of reading a pattern displayed on an optical display device having a frame repeating cycle, such as a cathode ray tube or a liquid crystal display device.

SUMMARY OF THE INVENTION

A first object of the present invention is to display an optical pattern such as characters, symbols, designs etc. on a tactile display unit provided with plural vibrating pins, vibrating corresponding to said pattern, for use as a reader for blind persons.

A second object of the present invention is to avoid flickering or beat which is often generated in case said optical pattern is a pattern having a frame repating period such as that on a cathode ray tube or a liquid crystal display device.

A third object of the present invention is to enable blind persons to recognize not only an optical pattern such as characters, symbols or designs printed on paper but also an optical pattern on a display device such as a cathode ray tube.

DETAILED DESCRIPTION OF THE PREFERRED EMBODIMENT

In reading a pattern displayed on a display device, the present invention enables the display of a clear pattern without flickering by optimum selection of reading frequency of the pattern information. It also provides a the pattern display of constant quality even in reading the patterns from various display devices of different frame frequencies.

In the following, the present invention will be clarified by an embodiment thereof shown in the attached drawings.

Figure 1:
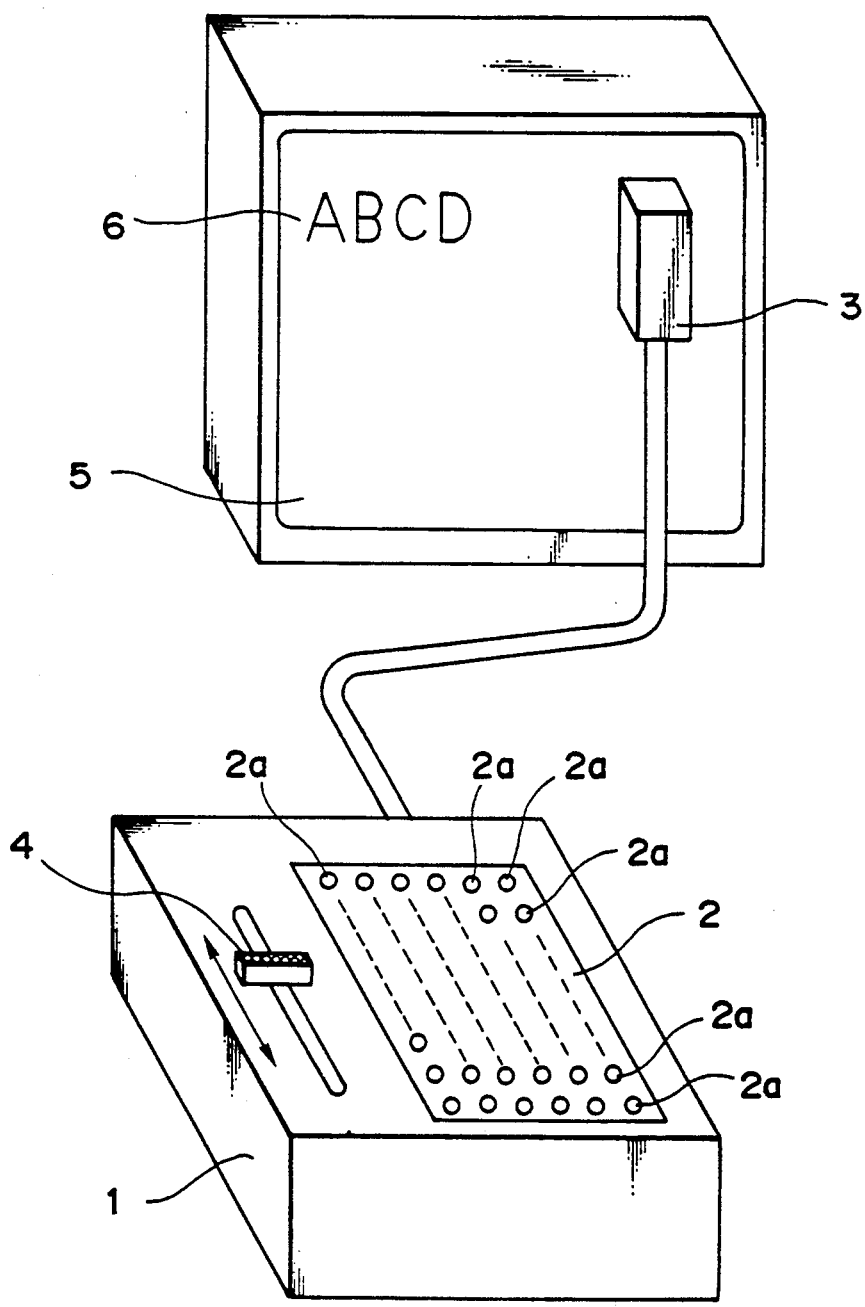
FIG. 1 is a perspective view of an embodiment of the present invention.

FIG. 1 is a schematic perspective view of a pattern reading apparatus embodying the present invention, wherein shown are a main body 1; a tactile unit 2 for displaying a read pattern, in a matrix array of plural pins 2a, by vertical vibration in those corresponding to said pattern; and a camera unit 3 for optically reading a pattern such as characters, symbols or designs and converting it into electrical signals.

There are also shown a reading period regulating lever 4, for regulating the period of pattern reading in the camera unit 3; an optical display unit 5 having a frame repeating period such as a cathode ray tube or a liquid crystal display device, from which the pattern is to be read; and a pattern 6 such as characters, symbols or designs shown on said display unit.

Figure 2:
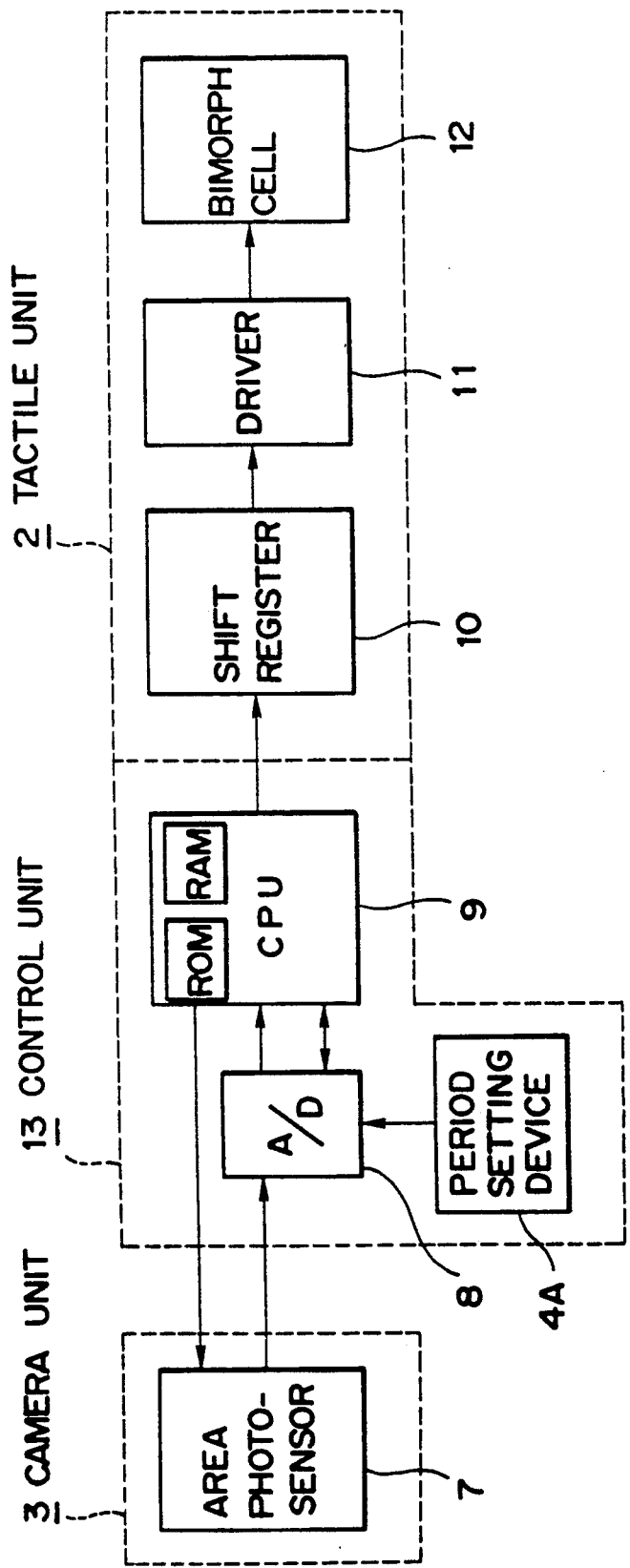
FIG. 2 is a block diagram of the control system of an embodiment of the present invention.

FIG. 2 is a block diagram of the control system of an embodiment of the present invention.

In FIG. 2, the camera unit 3 is provided with an unrepresented lens, and an area photosensor 7 serving as the photoelectric converting element. A control unit 13 is provided with a microprocessor including a central processing unit (CPU) 9, a ROM storing a control program, and a RAM temporarily storing information used in the processing.

An A/D converter 8 executes A/D conversion of the pattern signal from the area photosensor 7 under control signals from the CPU 9, thus obtaining converted data.

A reading period setting device 4A regulates a voltage entered into the A/D converter 8 through the control of an unrepresented variable resistor by the regulating lever 4 shown in FIG. 1. The regulated voltage is converted into a digital value by the A/D converter 8 and supplied to the CPU 9.

The tactile unit 2 is provided with a shift register 10, a driver 11 and a bimorph cell 12.

The CPU 9 provides the area photosensor 7 with clock pulses. In response to each clock pulse, the area photosensor 7 converts the pattern information of a line into electrical signals.

The A/D converter 8 effects A/D conversion of the pattern signal in response to the control signal from the CPU 9, thereby obtaining converted data. The CPU 9 compares said converted data with a predetermined reference value (TH), and identifies the pattern of dark or light level, respectively, if the converted data are larger or smaller than said reference value (TH).

Said data of dark or light level are stored in the shift register 10. When the data of a frame are stored in the shift register 10, a latch operation is conducted by a latch signal from the CPU 9, whereby all the data are collectively released to the driver 11. The driver 11 constantly receives pulse signals of ca. 230 Hz for driving the bimorph cell 12 from the CPU 9, and, in response to said pulse signals, the pattern read in the area photosensor 7 is displayed on the tactile unit 2. Thus, a blind person can recognize the read pattern.

If the pattern to be read has a frame period such as a pattern displayed on a display device, the reading period can be regulated with the regulating lever 4. The voltage set by the period setting device 4A is converted into a digital value by the A/D converter 8. After the lapse of an interval corresponding to said digital value, the CPU 9 resets the area photosensor 7 and supplies the area photosensor 7 with clock pulses again, thereby reading the pattern information.

The reduction of the influence of the frame period of the display device on the read pattern, which has been technically difficult, is made possible by suitable adjustment of the reading period of the apparatus of the present invention by the user himself.

Figure 3:
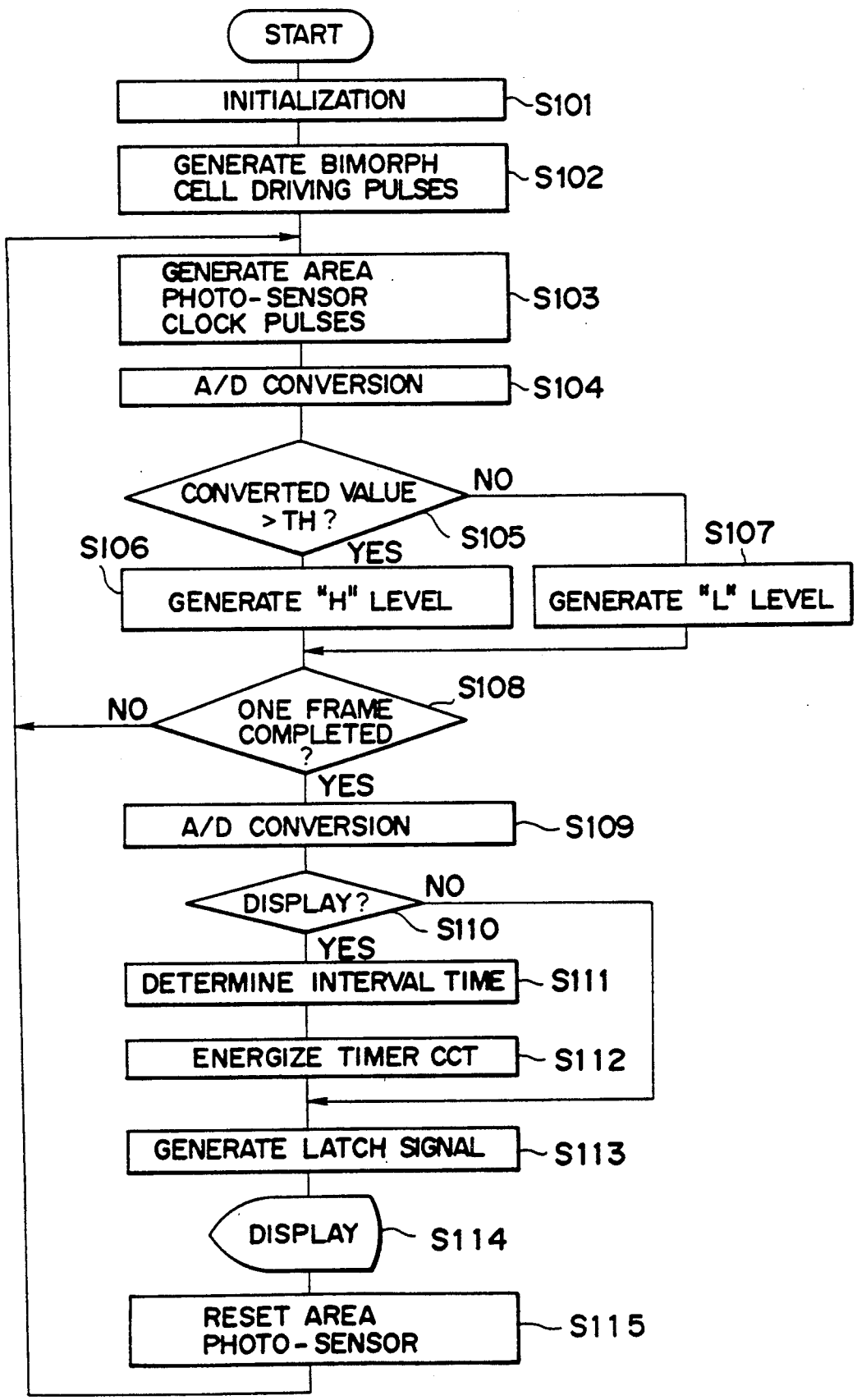
FIG. 3 is a flow chart showing an example of control sequence of said embodiment.

In the following the function of the present embodiment will be explained according to a flow chart shown in FIG. 3, indicating an example of the control sequence.

After the apparatus is activated, the control unit 13 initializes the various units in a step S101. Then, in a step S102, the pulses of ca. 230 Hz for driving the bimorph cell 12 are generated and supplied to the tactile unit 2. In a succeeding step S103, the clock pulses for the area photosensor 7 are generated and supplied to the camera unit 3 for reading the displayed pattern.

Then a step S104 effects the A/D conversion of the output signal of the area photosensor 7 to obtain converted data.

Then a discrimination step S105 compares said converted data with the reference value (TH). If the converted data are larger than the reference value (TH), there are discriminated data of dark level, and the sequence proceeds to a step S106. On the other hand, if they are smaller than the reference value, there are discriminated data of light level and the sequence proceeds to a step S107.

The step S106 supplies the tactile unit 2 with display data of "H" level, while the step S107 supplies display data of "L" level.

Then a discrimination step S108 discriminates, by an internal counter, whether the reading of pattern information of a frame has been completed. If the reading of a frame is still in progress, the sequence returns to the step S103 for continuing the pattern information reading. On the other hand, if the reading of a frame has been completed, a step S109 effects A/D conversion of a voltage set by the reading period setting device.

Then a discrimination step S110 discriminates the read pattern utilizing said converted value. If the converted value is smaller than a fixed value predetermined in the CPU 9, the read pattern is identified as a usual printed pattern (including handwritten or copied pattern) and the sequence proceeds to a step S113. On the other hand, if the converted value is larger than the predetermined fixed value, the read pattern is identified as a display pattern on a display device, and the sequence proceeds to a step S111.

The step S111 determines the interval corresponding to said converted value, and a step S112 activates a timer circuit for regulating the reading period.

Then, in a step S113, the CPU 9 sends a latch signal to the shift register 10, and a step S114 causes the bimorph cell to display a vibration pattern the same as the read pattern. Subsequently a step S115 resets the area photosensor 7, and the sequence returns to the step S103 for effecting the next pattern reading. Thereafter the steps S103 to S115 are repeatedly executed to periodically read the pattern information and display said information on the tactile unit 2.

Thus, according to the value set by the period setting device 4A, the interval is regulated in the steps S111, S112, thereby varying the reading period.

In the foregoing embodiment, the reading period is entered in an analog manner and is later converted into a digital value for entry into the CPU 9, but direct digital setting is also possible for example with the switches of the CPU 9.

Also in the foregoing embodiment the reading period is set in the main body of the apparatus, but the setting device therefor may be provided on the camera unit in order to improve the operability thereof.

As will be apparent from the foregoing description, the present invention provides a clear display, by reducing the flickering of the read pattern, which is caused by the influence of frame period of the display device and which has been a problem in the conventional reader for the blind person.

Also it is possible to obtain a display of constant quality in various display apparatus of various frame periods.

We claim:

1. A pattern reading apparatus comprising:
   first display means for outputting optical pattern information;
   conversion means for reading the optical pattern information outputted by said first display means and converting same into electrical signals;
   second display means for displaying pattern information by vibration of plural vibrating pins, the displayed pattern information corresponding to the pattern information read by said conversion means;
   reading period determining means provided near said second display means for variably setting a reading period when the optical pattern information outputted by said first display means is read by said conversion means; and
   control means for causing the electrical signals from said conversion means to be displayed by said second display means according to the reading period set by said reading period determining means.

2. An apparatus according to claim 1, wherein said conversion means comprises an area photosensor, and wherein said display means comprises a bimorph tactile matrix array.

3. A pattern reading apparatus comprising:
   first display means for outputting optical pattern information;
   photoelectric converter means for reading the optical pattern information outputted by said first display means and converting same into electrical signals;
   A/D converter means for converting the electrical signals output by said photoelectric converter means into digital signals;
   second display means for displaying pattern information by vibration of plural vibrating pins, the displayed pattern information corresponding to the digital signals output by said A/D converter means;
   reading period determining means provided near said second display means for variably setting a reading period when the electrical signals are converted by said A/D converter means and sending the set reading period to said A/D converter means; and
   control means for causing the digital signals output from said A/D converter means to be displayed by said second display means according to the reading period set by said reading period determining means.

4. A pattern reading apparatus comprising:
   photoelectric converter means for reading optical pattern information and converting same into electrical signals;

A/D converter means for converting the electrical signals output by said photoelectric converter means into digital signals;

display means for displaying pattern information by vibration of plural vibrating pins, the displayed pattern information corresponding to the digital signals output by said A/D converter means;

reading period determining means for variably setting a reading period of the electrical signals to be converted by said A/D converter means;

a timer circuit; and control means for causing the digital signals output from said A/D converter means to be displayed by said display means according to the reading period set by said reading period determining means, said control means being adapted to discriminate whether the optical pattern information read by said photoelectric converter means is a printed pattern or a display pattern on a display device, said control means being adapted, in case the optical pattern information is printed information, to release a latch signal, or, in case the optical pattern information is a display pattern on a display device, to determine an interval and then activate said timer circuit and release a latch signal.

5. An apparatus according to claim 4, wherein said control means is adapted to (a) identify (1) optical pattern information obtained from a printed image in case a converted value entered from said A/D converter means is smaller than a predetermined value, or (2) optical pattern information obtained from a display pattern on a display device in case said converted value is larger than said predetermined value, and (b) to release a latch signal in a process according to said identification.

6. A pattern reading apparatus comprising:

first display means for outputting optical pattern information;

converter means for reading the optical pattern information outputted by said first display means and converting same into electrical signals;

memory means for storing the pattern information read by said converter means;

second display means for displaying pattern information by the vibration of plural vibrating pins, the displayed pattern information corresponding to the pattern information stored in said memory means;

reading period determining means provided near said second display means for variably setting a reading period when the optical pattern information outputted by said first display means is read by said converter means; and control means for causing the electrical signals from said converter means to be displayed by said second display means according to the reading period set by said reading period determining means.

7. An apparatus according to claim 6, wherein said converter means comprises an area photosensor, and wherein said display means comprises a bimorph tactile matrix array.

8. A pattern reading apparatus comprising:

converter means for reading optical pattern information and converting it into electrical signals;

memory means for storing the pattern information read by said converter means;

display means for displaying pattern information by the vibration of plural vibrating pins, the displayed pattern information corresponding to the pattern information stored in said memory means;

reading period determining means for variably setting a reading period of the optical pattern information to be read by said converter means;

a timer circuit;

control means for causing the electrical signals from said converter means to be displayed by said display means according to the reading period set by said reading period determining means, said control means being adapted to discriminate whether the optical pattern information read by said converter means is obtained from a printed pattern or a display pattern on a display device, said control means being adapted, in case the optical pattern information is a printed pattern, to send a latch signal to said memory means, or, in case the optical pattern information is a display pattern on a display device, to determine an interval and then activate said timer circuit and send a latch signal to said memory means.

9. An apparatus according to claim 8, wherein said control means is adapted to (a) identify (1)optical pattern information obtained from a printed pattern in case a converted value entered from said converter means is smaller than a predetermined value, or (2) optical pattern information obtained from a display pattern on a display device in case said converted value is larger than said predetermined value, and (b) to send a latch signal to said memory means in a process according to said identification.

10. A pattern reading apparatus comprising:

an area photosensor for reading optical pattern information and converting it into electrical signals;

memory means for storing the pattern information read by said area photosensor;

a bimorph tactile matrix array for displaying pattern information by the vibration of plural vibrating pins, the displayed pattern information corresponding to the pattern information stored in said memory means;

reading period determining means for variably setting a reading period of the optical pattern information to be read by said area photosensor;

a timer circuit; and control means for causing the electrical signals from said area photosensor to be displayed by said bimorph tactile matrix array according to the reading period set by said reading period determining means, said control means being adapted to discriminate whether the optical pattern information read by said area photosensor is obtained from a printed pattern or a display pattern on a display device, said control means being adapted, in case the optical pattern information is a printed pattern, to send a latch signal to said memory means, to determined an interval and then activate said timer circuit and send a latch signal to said memory means.

11. An apparatus according to claim 9, wherein said control means is adapted to (a) identify (1)optical pattern information obtained from a printed pattern in case a converted value entered from said converter means is smaller than a predetermined value, or (2) optical pattern information obtained from a display pattern on a display device in case said converted value is larger than said predetermined value, and (b) to send a latch signal to said memory means in a process according to said identification.

12. A pattern reading apparatus comprising:
   first display means for outputting optical pattern information;
   photoelectric converter means for reading the optical pattern information outputted by said first display means and converting same into electrical signals;
   A/D converter means for converting the electrical signals output by said photoelectric converter means into digital signals;
   memory means for storing the digital signals converted by said A/D converter means;
   second display means for displaying pattern information by the vibration of plural vibration pins, the displayed pattern information corresponding to the digital signals stored in said memory means;
   reading period determining means provided near said second display means for variably setting a reading period when the electrical signals are converted by said A/D converter means and sending the set reading period to said A/D converter means; and
   control means for causing the digital signals from said A/D converter means to be displayed by said second display means through said memory means according to the reading period set by said reading period determining means.

13. An apparatus according to claim 12, wherein said photoelectric converter means comprises an area photosensor, and wherein said display means comprises a bimorph tactile matrix array.

14. A pattern reading apparatus comprising:
   photoelectric converter means for reading optical pattern information and converting it into electrical signals;
   A/D converter means for converting the electrical signals output by said photoelectric converter means into digital signals;
   memory means for storing the digital signals converted by said A/D converter means;
   display means for displaying pattern information by the vibration of plural vibrating pins, the displayed pattern information corresponding to the digital signals stored in said memory means;
   reading period determining means for variably setting a reading period of the electrical signals to be converted by said A/D converter means;
   a timer circuit; and
   control means for causing the digital signals from said A/D converter means to be displayed by said display means through said memory means according to the reading period set by said reading period determining means, said control means being adapted to discriminate whether the optical pattern information read by said photoelectric converter means is obtained from a printed pattern or a display pattern on a display device, said control means being adapted, in case the optical pattern information is a printed pattern, to send a latch signal to said memory means, or, in case the optical pattern information is a display pattern on a display device, to determine an interval and then activate said timer circuit and send a latch signal to said memory means.

15. An apparatus according to claim 14, wherein said control means is adapted to (a) identify (1) optical pattern information obtained from a printed pattern in case a converted value entered from said A/D converter means is smaller than a predetermined value, or (2) optical pattern information obtained from a display pattern on a display device in case said converted value is larger than said predetermined value, and (b) to send a latch signal to said memory means in a process according to said identification.

16. A pattern reading apparatus comprising:
   an area photosensor for reading optical pattern information and converting same into electrical signals;
   A/D converter means for converting the electrical signals output by said photoelectric converter means into digital signals;
   memory means for storing the digital signals converted by said A/D converter means;
   a bimorph tactile matrix array for displaying pattern information by the vibration of plural vibrating pins, the displayed pattern information corresponding to the digital signals stored in said memory means;
   reading period determining means for variably setting a reading period of the electrical signals to be converted by said A/D converter means;
   a timer circuit; and
   control means for causing the digital signals from said A/D converter means to be displayed by said bimorph tactile matrix array through said memory means according to the reading period set by said reading period determining means, said control means being adapted to discriminate whether the optical pattern information read by said photoelectric converter means is obtained from a printed pattern or a display pattern on a display device, said control means being adapted, in case the optical pattern information is a printed pattern, to send a latch signal to said memory means, or, in case the optical pattern information is a display pattern on a display device, to determine an interval and then activate a timer circuit and second a latch signal to said memory means.

17. An apparatus according to claim 15, wherein said control means is adapted to (a) identify (1) optical pattern information obtained from a printed pattern in case a converted value entered from said A/D converter means is smaller than a predetermined value, or (2) optical pattern information obtained from a display pattern on a display device in case said converted value is larger than said predetermined value, and to (b) send a latch signal to said memory means in a process according to said identification.

* * * * *

UNITED STATES PATENT AND TRADEMARK OFFICE
CERTIFICATE OF CORRECTION

PATENT NO. : 5,091,865
DATED : February 25, 1992
INVENTOR(S) : YASUHIRO YAMADA, ET AL.

It is certified that error appears in the above-identified patent and that said Letters Patent is hereby corrected as shown below:

COLUMN 1

Line 16, "pattern." should read --patterns.--.
Line 42, "frame repating" should read --frame repeating--.

COLUMN 3

Line 8, "following" should read --following,--.

COLUMN 4

Line 3, "Also" should read --Also,--.
Line 13, "Also" should read --Also,--.

COLUMN 6

Line 6, "circuit;" should read --circuit; and--.
Line 23, "(1)optical" should read --(1) optical--.

UNITED STATES PATENT AND TRADEMARK OFFICE
CERTIFICATE OF CORRECTION

PATENT NO. : 5,091,865
DATED : February 25, 1992
INVENTOR(S) : YASUHIRO YAMADA, ET AL.

It is certified that error appears in the above-identified patent and that said Letters Patent is hereby corrected as shown below:

COLUMN 6

Line 61, "claim 9," should read --claim 10,--.
    Line 62, "(1)optical" should read --(1) optical--.

Signed and Sealed this

Twenty-fourth Day of August, 1993

Attest:

BRUCE LEHMAN

Attesting Officer

Commissioner of Patents and Trademarks